(12) United States Patent
Schmitz et al.

(10) Patent No.: US 8,435,911 B2
(45) Date of Patent: May 7, 2013

(54) HYBRID CATALYST COMPOSITION FOR POLYMERIZATION OF OLEFINS

(75) Inventors: Harald Schmitz, Weinheim (DE); Shahram Mihan, Bad Soden (DE)

(73) Assignee: Basell Polyolefine GmbH, Wesseling (DE)

( * ) Notice: Subject to any disclaimer, the term of this patent is extended or adjusted under 35 U.S.C. 154(b) by 455 days.

(21) Appl. No.: 12/586,256

(22) Filed: Sep. 18, 2009

(65) Prior Publication Data

US 2010/0099825 A1 Apr. 22, 2010

Related U.S. Application Data

(60) Provisional application No. 61/196,528, filed on Oct. 17, 2008.

(30) Foreign Application Priority Data

Oct. 16, 2008 (EP) .................... 08018107

(51) Int. Cl.
| | | |
|---|---|---|
| C08F 4/6592 | (2006.01) | |
| C08F 4/70 | (2006.01) | |
| B01J 31/18 | (2006.01) | |
| B01J 31/22 | (2006.01) | |

(52) U.S. Cl.
USPC ........... 502/113; 502/103; 502/120; 502/152; 502/157; 526/113; 526/115; 526/129; 526/160; 526/161; 526/165; 526/169.1; 526/943

(58) Field of Classification Search .................. 502/103, 502/113, 120, 152, 167; 526/113, 116, 129, 526/160, 162, 165, 943, 115, 161, 169.1
See application file for complete search history.

(56) References Cited

U.S. PATENT DOCUMENTS

| | | | |
|---|---|---|---|
| 3,125,547 | A | 3/1964 | Blatz |
| 4,461,873 | A | 7/1984 | Bailey et al. |
| 5,382,630 | A | 1/1995 | Stehling et al. |
| 5,530,065 | A | 6/1996 | Farley et al. |
| 5,698,642 | A | 12/1997 | Govoni et al. |
| 5,707,751 | A | 1/1998 | Garza et al. |
| 6,268,518 | B1 * | 7/2001 | Resconi et al. ............. 556/43 |
| 6,350,814 | B1 | 2/2002 | Bauer et al. |
| 6,365,779 | B2 | 4/2002 | Devore et al. |
| 6,417,302 | B1 | 7/2002 | Bohnen |
| 6,417,305 | B2 | 7/2002 | Bennett |
| 6,433,203 | B1 | 8/2002 | Dall'occo et al. |
| 6,620,953 | B1 | 9/2003 | Bingel et al. |
| 7,666,959 | B2 * | 2/2010 | Razavi ..................... 526/115 |
| 2003/0125195 | A1 | 7/2003 | Britovsek et al. |
| 2003/0225225 | A1 * | 12/2003 | Shih ........................ 526/127 |
| 2005/0159300 | A1 | 7/2005 | Jensen |
| 2007/0213205 | A1 | 9/2007 | Mihan |
| 2007/0255033 | A1 | 11/2007 | Kipke et al. |

FOREIGN PATENT DOCUMENTS

WO WO 95/27005 10/1995

OTHER PUBLICATIONS

Small et al., "Highly Active Iron and Cobalt Catalysts for the Polymerization of Ethylene," *J. Am. Chem. Soc.*, 120, (1998), 4049-4050.
Britovsek, et al., "Novel Olefin Polymerization Catalysts Based On Iron and Cobalt" *J. Chem. Soc., Chem. Commun.* (1998) 849.
Benoit et al., "A Universal Calibration for Gel Permeation Chromatography," *J. Polymer Sci. Phys. Ed.*, 5, (1967), 753-759.
Strauss, "The Search for Larger and More Weakly Coordinating Anions" *Chem. Rev.*, 93 (1993) 927.
Randall, "A Review of High Respolution Liquid $^{13}$Carbon Nuclear Magnetic Resonance Characterizations of Etheylene-Based Polymers," *JMS-REV Macromol. Chem. Phys.*, C29(2&3), 201-317, (1989).
Souane et al., "Pyridine bis(imine) cobalt of iron complexes for ethylene and 1-hexene (co)polymerisation," *C. R. Chimie*, 5, (2002), 43-48.
Chen et al., "Halogen-Substituted 2,6-Bis(imino)pyridyl Iron and Cobalt Complexes: Highly Active Catalysts for Polymerization and Oligomerization of Ethylene," *Organometallics*, 22, (2003), 4312-4321.

\* cited by examiner

*Primary Examiner* — Caixia Lu

(57) ABSTRACT

The present invention relates to a new hybrid catalyst system for the polymerization of olefins and to a polymerization process carried out in the presence of said catalyst. The new hybrid catalyst system comprises a tridendate iron compound and a zirconocene having a bridge of at least three carbon atoms connecting two indenyl ligands.

7 Claims, No Drawings

HYBRID CATALYST COMPOSITION FOR POLYMERIZATION OF OLEFINS

This application claims priority to European Patent Application 08018107.6 filed 16 Oct. 2008 and provisional U.S. Appl. No. 61/196,528 filed 17 Oct. 2008; the disclosures of European Application 08018107.6 and U.S. Appl. No. 61/196,528, each as filed, are incorporated herein by reference.

The present invention relates to a new catalyst system for the polymerization of olefins and to a polymerization process carried out in the presence of said catalyst, and also fibers, moldings, films or polymer blends.

WO 99/46302 discloses hybrid catalyst systems comprising an iron catalyst component having a tridentate ligand and a further catalyst component.

WO 2005/103095 A1 discloses a hybrid catalyst composition comprising at least two different polymerization catalysts of which the first one is at least one polymerization catalyst based on a hafnocene and the second one is at least one polymerization catalyst based on an iron component having a tridentate ligand bearing at least two aryl radicals with each bearing a halogen or tert. alkyl substituent in the ortho position.

In WO 00/31088 metallocene compounds are disclosed which have a carbon bridge of more than two carbon atoms and show higher polymerization activities than other carbon bridged metallocenes, however, less polymerization activity than silyl bridged metallocenes.

It is an object of the present invention to provide for a catalyst system having a good activity and at the same time leading to polymers having high molecular weights. The catalyst system shall further provide the opportunity for preparing polymers showing a new combination of characteristics.

It has been surprisingly found that the activity of a hybrid catalyst system may be improved by replacing the hafnocene catalyst component by a zirconocene compound which has two identical indenyl ligands linked to one another by a bridging group longer than an ethylene radical. Although the molecular weights are slightly lower than the molecular weights of the polymers prepared by the hafnocene containing hybrid system they are acceptable and even surprisingly high in view of other zirconocene catalyst components. In the polymerization of tethylene the catalyst system makes it possible to prepare polyethylene with a low long chain branching content.

Furthermore, polymer blends comprising at least one polyethylene according to the invention have been found.

In addition, the use of the polyethylenes of the invention for producing fibers, films and moldings has been found.

The present invention provides a catalyst composition comprising at least two different polymerization catalysts of which (A) is at least one polymerization catalyst based on a transition metal component having a tridentate ligand bearing at least two ortho, ortho-disubstituted aryl radicals and of which (B) is at least one polymerization catalyst based on a zirconocene complex comprising two indenyl ligands bridged by an alkylene bridge which chain is made up of at least three carbon atoms.

The invention further provides a process for the polymerization of olefins in the presence of the catalyst composition of the invention.

Suitable catalysts (A) are transition metal complexes with at least one ligand of the general formula (I),

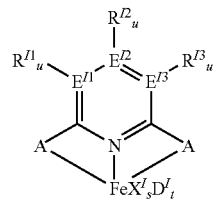

(I)

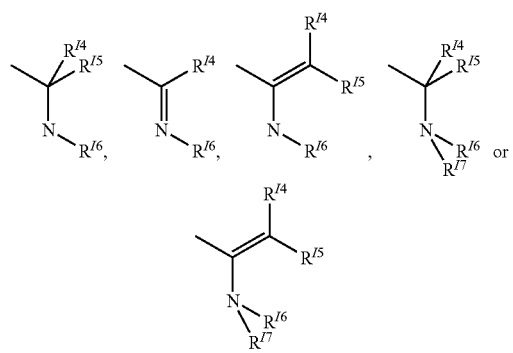

wherein the variables have the following meaning:
A independently from one another denote $R^{I1}$-$R^{I3}$ independently of one another denote hydrogen, $C_1$-$C_{22}$-alkyl, $C_2$-$C_{22}$-alkenyl, $C_6$-$C_{22}$-aryl, $NR^{I9}{}_2$, $OR^{I9}$, halogen, $SiR^{I8}{}_3$ or five-, six- or seven-membered heterocycles, which comprise at least one atom from the group consisting of N, P, O or S, wherein the organic radicals $R^{I1}$-$R^{I3}$ are optionally substituted by halogen radicals, $C_1$-$C_{10}$-alkyl radicals, $C_2$-$C_{10}$-alkenyl radicals, $C_6$-$C_{20}$-aryl radicals, $NR^{I9}{}_2$, $OR^{I9}$ or $SiR^{I8}{}_3$ and/or two radicals $R^{I1}$-$R^{I3}$ are bonded with one another to form a five-, six- or seven-membered ring and/or two radicals $R^{I1}$-$R^{I3}$ are bonded with one another to form a five-, six- or seven-membered heterocycle, which comprises at least one atom from the group consisting of N, P, O or S, $R^{I4}$, $R^{I5}$ independently of one another denote hydrogen, $C_1$-$C_{20}$-alkyl, $C_2$-$C_{20}$-alkenyl, $C_6$-$C_{20}$-aryl, or $SiR^{I8}{}_3$, wherein the organic radicals $R^{I4}$, $R^{I5}$ are optionally substituted by halogen radicals, $C_1$-$C_{10}$-alkyl radicals, $C_2$-$C_{10}$-alkenyl radicals, or $C_6$-$C_{20}$-aryl radicals, or two radicals $R^{I4}$, $R^{I5}$ are bonded with one another to form a five- or six-membered carbon ring, $R^{I6}$, $R^{I7}$ independently of one another denote hydrogen, $C_1$-$C_{20}$-alkyl, $C_2$-$C_{20}$-alkenyl, $C_6$-$C_{20}$-aryl, or $SiR^{I8}{}_3$, wherein the organic radicals $R^{I6}$, $R^{I7}$ are optionally substituted by halogen radicals, $C_1$-$C_{10}$-alkyl radicals, $C_2$-$C_{10}$-alkenyl radicals, or $C_6$-$C_{20}$-aryl radicals, or the two radicals $R^{I6}$, $R^{I7}$ are bonded with one another to form a five- or six-membered carbon ring, $R^{I8}$ independently of one another denote hydrogen, $C_1$-$C_{22}$-alkyl, $C_2$-$C_{22}$-alkenyl, $C_6$-$C_{22}$-aryl, arylalkyl having 1 to 10 carbon atoms in the alkyl radical and 6 to 20 carbon atoms in the aryl radical, $R^{I9}$ independently of one another denote hydrogen, $C_1$-$C_{22}$-alkyl, $C_2$-$C_{22}$-alkenyl, $C_6$-$C_{22}$-aryl, or $SiR^{I8}{}_3$, wherein the organic radicals $R^{I9}$ is optionally substituted by halogen radicals, $C_1$-$C_{10}$-alkyl radicals, $C_2$-$C_{10}$-alkenyl radicals, or $C_6$-$C_{20}$-aryl radicals, and/or two radicals $R^{I9}$ are bonded with one another to form a five- or six-membered ring, $E^{J1}$-$E^{J3}$ independently of one another denote carbon or nitrogen, u independently of one another is 0 if the respective radical is bound to nitrogen and 1 if the respective radical is bound to carbon, $X^I$ independently of one another denote fluorine, chlorine, bromine, iodine, hydrogen, $C_1$-$C_{10}$-alkyl, $C_2$-$C_{10}$-alkenyl, $C_6$-$C_{20}$-aryl, $NR^{J10}{}_2$, $SO_3R^{J10}$, CN, SCN, β-diketonate, CO, $BF_4^-$, $PF_6^-$ or bulky non-coordinating anions, wherein the organic radicals $X^I$ is optionally substituted by halogen radicals, $C_1$-$C_{10}$-alkyl radicals, $C_2$-$C_{10}$-alkenyl radicals, or $C_6$-$C_{20}$-aryl radicals, and the radicals $X^I$ are optionally bonded with one another, $R^{J10}$ independently of one another denote hydrogen, $C_1$-$C_{22}$-alkyl, $C_2$-$C_{22}$-alkenyl, $C_6$-$C_{22}$-aryl, or $SiR^{J11}{}_3$, wherein the organic radicals $R^{J10}$ are optionally substituted by halogen radicals, $C_1$-$C_{10}$-alkyl radicals, $C_2$-$C_{10}$-alkenyl radicals, or $C_6$-$C_{20}$-aryl radicals, $R^{J11}$ independently of one another denote hydrogen, $C_1$-$C_{20}$-alkyl, $C_2$-$C_{20}$-alkenyl, $C_6$-$C_{20}$-aryl, wherein the organic radicals $R^{J11}$ optionally substituted by halogen radicals, $C_1$-$C_{10}$-alkyl radicals, $C_2$-$C_{10}$-alkenyl radicals, or $C_6$-$C_{20}$-aryl radicals, s 1, 2, 3 or 4, $D^I$ is a neutral donor, t is 0 to 4.

The three atoms $E^{J1}$ to $E^{J3}$ are each preferably carbon.

The substituents $R^{J1}$-$R^{J3}$ can be varied within a wide range. Possible carboorganic substituents $R^{J1}$-$R^{J3}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two vicinal radicals $R^{J1}$ to $R^{J3}$ are optionally joined to form a 5-, 6- or 7-membered carbon ring or a five-, six- or seven-membered heterocycle containing at least one atom from the group consisting of N, P, O and S and/or the organic radicals $R^{J1}$-$R^{J3}$ are unsubstituted or substituted by halogens such as fluorine, chlorine or bromine. Furthermore, $R^{J1}$-$R^{J3}$ can also be amino $NR^{J9}{}_2$ or $N(SiR^{J8}{}_3)_2$, alkoxy or aryloxy $OR^{J9}$, for example dimethylamino, N-pyrrolidinyl, picolinyl, methoxy, ethoxy or isopropoxy or halogen such as fluorine, chlorine or bromine.

Preferred radicals $R^{J1}$-$R^{J3}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

The substituents $R^{J4}$-$R^{J7}$, too, can be varied within a wide range. Possible carboorganic substituents $R^{J4}$-$R^{J7}$ are, for example, the following: $C_1$-$C_{22}$-alkyl which are linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which are linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl, where the arylalkyl may be substituted by further alkyl groups, e.g. benzyl, o-, m-, p-methylbenzyl, 1- or 2-ethylphenyl, where two geminal radicals $R^{J4}$ to $R^{J7}$ optionally are joined to form a 5-, 6- or 7-membered carbon ring and/or a five-, six- or seven-membered heterocycle containing at least one atom from the group consisting of N, P, O and S and/or the organic radicals $R^{J4}$-$R^{J7}$ are unsubstituted or substituted by halogens such as fluorine, chlorine or bromine. Furthermore, $R^{J4}$-$R^{J7}$ may be amino $NR^{J9}{}_2$ or $N(SiR^{J8}{}_3)_2$, for example dimethylamino, N-pyrrolidinyl or picolinyl. Possible radicals $R^{J8}$ in organosilicone substituents $SiR^{J8}{}_3$ are the same carboorganic radicals as have been described above for $R^{J1}$-$R^{J3}$, where two $R^{J19}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{J19}{}_3$ radicals can also be bound via nitrogen to the carbon bearing them.

Preferred radicals $R^{J4}$-$R^{J7}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl. Preference is also given to amide substituents $NR^{J9}{}_2$, in particular secondary amides such as dimethylamide, N-ethylmethylamide, diethylamide, N-methylpropylamide, N-methylisopropylamide, N-ethyliso-propylamide, dipropylamide, diisopropylamide, N-methylbutylamide, N-ethylbutylamide, N-methyltert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclohexylamide, N-ethylcyclohexylamide, N-isopropylcyclohexylamide, N-tert-butyl-cyclohexylamide, dicyclohexylamide, pyrrolidine, piperidine, hexamethylenimine, decahydro-quinoline, diphenylamine, N-methylanilide or N-ethylanilide.

Variation of the radicals $R^{J9}$ enables, for example, physical properties such as solubility to be finely adjusted. Possible carboorganic substituents $R^{J9}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{J9}$ may also be joined to form a 5- or 6-membered ring and the organic radicals $R^{I9}$ may also be substituted by halogens such as fluorine, chlorine or bromine. Possible radicals $R^{I8}$ in organosilicon substituents $SiR^{I8}{}_3$ are the same radicals as described above for $R^{I9}$, where two radicals $R^{I8}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{I9}$.

The ligands $X^I$ result, for example, from the choice of the appropriate starting metal compounds used for the synthesis of the iron complexes, but can also be varied afterwards. Possible ligands $X^I$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^I$. As further ligands $X^I$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_6)_4^-$. Amides, alkoxides, sulfonates, carboxylates and β-diketonates are also particularly useful ligands $X^I$. Some of these substituted ligands $X^I$ are particularly preferably used since they are obtainable from cheap and readily available starting materials. Thus, a particularly preferred embodiment is that in which $X^I$ is dimethylamide, methoxide, ethoxide, isopropoxide, phenoxide, naphthoxide, triflate, p-toluenesulfonate, acetate or acetylacetonate.

The number s of the ligands $X^I$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

$D^I$ is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands $D^I$ can be from 0 to 4 and is often dependent on the solvent in which the iron complex is prepared and the time for which the resulting complexes are dried and can therefore also be a nonintegral number such as 0.5 or 1.5. In particular, t is 0, 1 or 2.

Preferably, the iron catalyst is of formula (Ia)

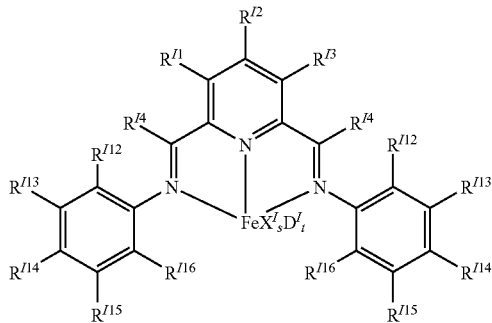

(Ia)

wherein the variables have the following meaning:
$R^{I1}$, $R^{I2}$, $R^{I3}$, $R^{I8}$, $R^{I9}$, $X^I$, $D^I$, s, and t are as defined for formula (I), $R^{I4}$ independently of one another denote hydrogen, $C_1$-$C_{20}$-alkyl, $C_2$-$C_{20}$-alkenyl, $C_6$-$C_{20}$-aryl, arylalkyl having 1 to 10 carbon atoms in the alkyl radical and 6 to 20 carbon atoms in the aryl radical, or $SiR^{I8}{}_3$, wherein the organic radicals $R^{I4}$ can also be substituted by halogens, $R^{I12}$-$R^{I16}$ independently of one another denote hydrogen, $C_1$-$C_{22}$-alkyl, $C_2$-$C_{22}$-alkenyl, $C_6$-$C_{22}$-aryl, arylalkyl having 1 to 10 carbon atoms in the alkyl radical and 6 to 20 carbon atoms in the aryl radical, $NR^{I9}{}_2$, $OR^{I9}$, halogen, $SiR^{I8}{}_3$ or five-, six- or seven-membered heterocyclyl, which comprises at least one atom from the group consisting of N, P, O or S, wherein the organic radicals $R^{I12}$-$R^{I16}$ are unsubstituted or substituted by halogens, $NR^{I9}{}_2$, $OR^{I9}$ or $SiR^{I8}{}_3$ or two radicals $R^{I12}$-$R^{I16}$ are bonded with one another to form a five-, six- or seven-membered ring or two radicals $R^{I12}$-$R^{I16}$ are bonded with one another to form a five-, six- or seven-membered heterocyclyl, which comprises at least one atom from the group consisting of N, P, O or S, wherein at least one of the radicals $R^{I12}$-$R^{I16}$ is selected from the group consisting of chlorine, bromine, iodine, $CF_3$ or $OR^{I9}$.

The substituents $R^{I4}$ can be varied within a wide range. Possible carboorganic substituents $R^{I4}$ are, for example, the following: hydrogen, $C_1$-$C_{22}$-alkyl which is linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which is unsubstituted or bears a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which is linear, cyclic or branched and in which the double bond is internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which is may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{I4}$ are unsubstituted or substituted by halogens such as fluorine, chlorine or bromine. Furthermore, $R^4$ can be amino $NR^{I9}{}_2$ or $N(SiR^{I8}{}_3)_2$, for example dimethylamino, N-pyrrolidinyl or picolinyl. Possible radicals $R^{I8}$ in organosilicon substituents $SiR^{I8}{}_3$ are the same carboorganic radicals as described above for $R^{I1}$-$R^{I3}$ in formula (I), where two radicals $R^{I19}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{I19}{}_3$ radicals can also be bound via nitrogen to the carbon bearing them.

Preferred radicals $R^{I4}$ are hydrogen, methyl, ethyl, n-propyl, isopropyl, n-butyl, isobutyl, tert-butyl, n-pentyl, n-hexyl, n-heptyl, n-octyl or benzyl, in particular hydrogen or methyl.

The substituents $R^{I12}$-$R^{I16}$ can be varied within a wide range. Possible carboorganic substituents $R^{I12}$-$R^{I16}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two vicinakl radicals $R^{I12}$-$R^{I16}$ are optionally joined to form a 5-, 6- or 7-membered ring and/or a five-, six- or seven-membered heterocycle containing at least one atom from the group consisting of N, P, O and S and/or the organic radicals $R^{I12}$-$R^{I16}$ are unsubstituted or substituted by halogens such as fluorine, chlorine or bromine. Furthermore, $R^{I12}$-$R^{I16}$ can also be amino $NR^{I9}{}_2$ or $N(SiR^{I8}{}_3)_2$, alkoxy or aryloxy $OR^{I6}$, for example dimethylamino, N-pyrrolidinyl, picolinyl, methoxy, ethoxy or isopropoxy or halogen such as fluorine, chlorine or bromine. Possible radicals $R^{I8}$ in organosilicon substituents $SiR^{I8}{}_3$ are the same carboorganic radicals as have been described above in formula (I).

Preferred radicals $R^{I12}$, $R^{I16}$ are methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{I12}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine and $R^{I16}$ are each a halogen such as fluorine, chlorine or bromine. Particular preference is given to $R^{I12}$ each being a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl and $R^{I16}$ each being a halogen such as fluorine, chlorine or bromine.

Preferred radicals $R^{I13}$-$R^{I15}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. It is in particular preferred, that $R^{I14}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{I13}$ and $R^{I15}$ are each hydrogen.

In the most preferred embodiment the radicals $R^{I13}$ and $R^{I15}$ are identical, $R^{I12}$ are identical, $R^{I14}$ are identical, and $R^{I16}$ are identical.

In an especially preferred embodiment the transition metal catalyst compound A) is of formula (Ib)

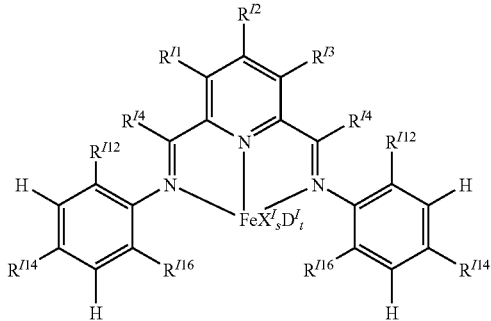

(Ib)

where
$R^{I4}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, arylalkyl having from 1 to 10 carbon atoms in the alkyl part and 6-20 carbon atoms in the aryl part, $NR^{I9}{}_2$, $SiR^{I8}{}_3$, where the organic radicals $R^{I4}$ is unsubstituted or substituted by halogens, $R^{I12}$, $R^{I16}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, arylalkyl having from 1 to 10 carbon atoms in the alkyl part and 6-20 carbon atoms in the aryl part, halogen, $NR^{I9}{}_2$, $OR^{I9}$, $SiR^{I8}{}_3$, where the organic radicals $R^{I12}$, $R^{I16}$ are unsubstituted or substituted by halogens, $R^{I14}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, arylalkyl having from 1 to 10 carbon atoms in the alkyl part and 6-20 carbon atoms in the aryl part, halogen, $NR^{I9}{}_2$, $OR^{I9}$, $SiR^{I8}{}_3$, where the organic radicals $R^{I14}$ are unsubstituted or substituted by halogens, and The substituents $R^{I12}$, $R^{I14}$, and $R^{I16}$ can be varied within a wide range. Possible carboorganic substituents $R^{I12}$, $R^{I14}$, and $R^{I16}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{I12}$, $R^{I14}$, and $R^{I16}$ may also be substituted by halogens such as fluorine, chlorine or bromine. Furthermore, $R^{I12}$, $R^{I14}$ and $R^{I16}$ can be halogen such as fluorine, chlorine, bromine, amino $NR^{I9}{}_2$ or $N(SiR^{I8}{}_3)_2$, alkoxy or aryloxy $OR^{I9}$, for example dimethylamino, N-pyrrolidinyl, picolinyl, methoxy, ethoxy or isopropoxy.

Preferred radicals $R^{I14}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{I14}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine.

Preferred radicals $R^{I12}$ and $R^{I16}$ are as defined for formula (I).

In particular the radicals $R^{I12}$ are identical, the radicals $R^{I14}$ are identical and the radicals $R^{I16}$ are identical. This is also preferred in the preferred embodiments described above.

$R^{I1}$-$R^{I3}$, v, $X^I$, $R^{I8}$, $R^{I9}$, s, $D^I$ and t are defined as for formula (I).

The preparation of the compounds (A) is described, for example, in J. Am. Chem. Soc. 120, p. 4049 ff. (1998), J. Chem. Soc., Chem. Commun. 1998, 849, and in WO 98/27124. Preferred complexes (A) are 2,6-diacetylpyridinebis(2,6-dimethylphenylimine)iron dichloride, 2,6-diacetyl-pyridinebis(2,4,6-trimethylphenylimine)iron dichloride, 2,6-diacetylpyridinebis(2-chloro-6-methylphenylimine)iron dichloride, 2,6-diacetylpyridinebis(2,6-diisopropylphenylimine)iron dichloride, 2,6-diacetylpyridinebis(2,6-dichlorophenylimine)iron dichloride, 2,6-pyridinedicarboxaldehydebis(2,6-diisopropylphenylimine)iron dichloride, diacetylpyridinebis(2,6-dichlorophenylimine)iron dichloride, diacetylpyridinebis(2,6-difluorophenylimine)iron dichloride, diacetylpyridinebis(2,6-dibromophenyl-imine)iron dichloride or the respective dibromides or tribromides.

Suitable catalyst components (B) are zirconocenes of formula (II)

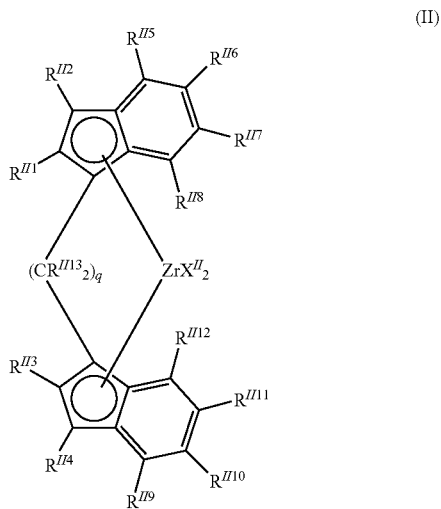

(II)

wherein
$R^{II1}$ to $R^{II12}$ are the same or different from each other, hydrogen or a $C_1$-$C_{40}$ radical, and optionally two adjacent $R^{II1}$ to $R^{II12}$ substituents can form a ring comprising from 5 to 8 carbon atoms;
$R^{II13}$ are the same or different and are each hydrogen atoms, $C_1$-$C_{20}$-alkyl-, $C_3$-$C_{20}$-cycloalkyl-, $C_2$-$C_{20}$-alkenyl-, $C_6$-$C_{20}$-aryl-, $C_7$-$C_{20}$-alkylaryl-, $C_7$-$C_{20}$-arylalkyl-, $NR^3_2$—, $PR^3_2$—, $AsR^3_2$—, $OR^3$—, $SR^3$— or $SeR^3$ radicals, optionally containing silicon, germanium or halogen atoms;
$X^{II}$ are identical or different and are each a hydrogen atom, a halogen atom, or a $C_{1\text{-}22}$ radical, —$OR^{II14}$ or —$NR^{II14}R^{II15}$, the radicals $R^{II14}$ and $R^{II15}$ being each $C_1$-$C_{32}$ radical, $C_1$-$C_{32}$ fluoroalkyl or fluoroaryl radical, where two radicals $X^{II}$ may also be joined to one another;
q is an integer from 3 to 8, preferably from 3 to 5.

The radicals $X^{II}$ are identical or different, preferably identical, and are each halogen, for example fluorine, chlorine, bromine, iodine, $C_1$-$C_{20}$-, preferably $C_1$-$C_4$-alkyl, $C_2$-$C_{20}$-, preferably $C_2$-$C_4$-alkenyl, $C_6$-$C_{22}$-, preferably $C_6$-$C_{10}$-aryl, an alkylaryl or arylalkyl group having from 1 to 10, preferably from 1 to 4 carbon atoms in the alkyl part and from 6 to 22, preferably from 6 to 10, carbon atoms in the aryl part, —$OR^{II14}$ or —$NR^{II14}R^{II15}$, preferably —$OR^{II14}$, where two radicals $X^{II}$ may also be joined to one another, preferably two radicals —$OR^{II14}$ which form, in particular, a substituted or unsubstituted 1,1'-di-2-phenoxide radical. Two radicals $X^{II}$ can also form a substituted or unsubstituted diene ligand, in particular a 1,3-diene ligand. The radicals $R^{II14}$ and $R^{II15}$ are each $C_1$-$C_{10}$-, preferably $C_1$-$C_4$-alkyl, $C_6$-$C_{15}$-, preferably $C_6$-$C_{10}$-aryl, alkylaryl, arylalkyl, fluoroalkyl or fluoroaryl each having from 1 to 10, preferably from 1 to 4, carbon atoms in the alkyl radical and from 6 to 22, preferably from 6 to 10, carbon atoms in the aryl radical.

Examples of especially preferred radicals $X^{II}$ are chlorine and methyl.

The radicals $R^{II1}$ to $R^{II12}$ may be the same or different and are each hydrogen or a $C_1$-$C_{40}$ radical which also may contain heteroatoms.

$R^{II1}$ to $R^{II12}$ may be a cyclic, branched or unbranched $C_1$-$C_{20}$-, preferably $C_1$-$C_8$-alkyl radical, a $C_2$-$C_{20}$-, preferably $C_2$-$C_8$-alkenyl radical, an arylalkyl radical having from 1 to 10, preferably from 1 to 4 carbon atoms in the alkyl part and from 6 to 22, preferably from 6 to 10 carbon atoms in the aryl part or a $C_2$-$C_{40}$-, preferably $C_4$-$C_{24}$ heteroaromatic radical, particularly selected from the group consisting of substituted or unsubstituted thienyl radicals or of substituted or unsubstituted furyl radicals.

Examples of particularly preferred radicals $R^{II1}$ and $R^{II3}$ are hydrogen, methyl, ethyl, n-propyl, isopropyl, n-butyl, i-butyl, s-butyl, t-butyl, n-pentyl, cyclopentyl, n-hexyl, cyclohexyl, n-heptyl, n-octyl, 2-(5-methyl)thienyl, 2-(5-methyl)furyl, benzyl and 2-phenylethyl, in particular hydrogen, methyl, ethyl or isopropyl.

Particularly preferred radicals $R^{II2}$, $R^{II4}$, $R^{II10}$, $R^{II11}$, $R^{II16}$ and $R^{II17}$ are hydrogen.

Examples of particularly preferred radicals $R^{II5}$, $R^{II8}$, $R^{II9}$ and $R^{II12}$ are hydrogen, methyl, ethyl, n-propyl, isopropyl, n-butyl, i-butyl, s-butyl, t-butyl, n-pentyl, cyclopentyl, n-hexyl, cyclohexyl, n-heptyl, n-octyl, 2-(5-methyl)thienyl, 2-(5-methyl)furyl, benzyl and 2-phenylethyl, in particular methyl, ethyl or isopropyl.

As possible support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate. Catalyst components (A) and (B) are preferably applied to a common support in order to ensure a relatively close spatial proximity of the different catalyst centres and thus to ensure good mixing of the different polymers formed.

Particular preference is given to a catalyst system comprising at least one late transition metal catalyst (A), at least one metallocene catalyst (B), at least one activating compound and preferably at least one support component.

In a preferred embodiment of the invention, the catalyst system comprises at least one activating compound. They are preferably used in an excess or in stoichiometric amounts based on the catalysts which they activate. In general, the molar ratio of catalyst to activating compound can be from 1:0.1 to 1:10000. Such activator compounds are uncharged, strong Lewis acids, ionic compounds having a Lewis-acid cation or a ionic compounds containing a Brönsted acid as cation in general. Further details on suitable activators of the polymerization catalysts of the present invention, especially on definition of strong, uncharged Lewis acids and Lewis acid cations, and preferred embodiments of such activators, their mode of preparation as well as particularities and the stoichiometry of their use have already been set forth in detail in WO05/103096 from the same applicant. Examples are aluminoxanes, hydroxyaluminoxanes, boranes, boroxins, boronic acids and borinic acids. Further examples of strong, uncharged Lewis acids for use as activating compounds are given in WO 00/31090 and WO05/103096 incorporated hereto by reference. Suitable activating compounds are both as an example and as a strongly preferred embodiment, compounds such as an aluminoxane, a strong uncharged Lewis acid, an ionic compound having a Lewis-acid cation or an ionic compound containing. As aluminoxanes, it is possible to use, for example, the compounds described in WO 00/31090 incorporated hereto by reference. Particularly useful aluminoxanes are open-chain or cyclic aluminoxane compounds of the general formula (III) or (IV)

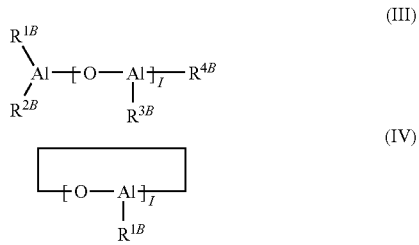

where $R^{1B}$-$R^{4B}$ are each, independently of one another, a $C_1$-$C_6$-alkyl group, preferably a methyl, ethyl, butyl or isobutyl group and I is an integer from 1 to 40, preferably from 4 to 25.

A particularly useful aluminoxane compound is methyl aluminoxane (MAO).

Furthermore modified aluminoxanes in which some of the hydrocarbon radicals have been replaced by hydrogen atoms or alkoxy, aryloxy, siloxy or amide radicals can also be used in place of the aluminoxane compounds of the formula (III) or (IV) as activating compound.

Boranes and boroxines are particularly useful as activating compound, such as trialkylborane, triarylborane or trimethylboroxine. Particular preference is given to using boranes which bear at least two perfluorinated aryl radicals. More preferably, a compound selected from the list consisting of triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane is used, most preferably the activating compound is tris(pentafluorophenyl)borane. Particular mention is also made of borinic acids having perfluorinated aryl radicals, for example $(C_6F_6)_2BOH$. More generic definitions of suitable boron-based Lewis acids compounds that can be used as activating compounds are given WO05/103096 incorporated hereto by reference, as said above.

Compounds containing anionic boron heterocycles as described in WO 97/36937 incorporated hereto by reference, such as for example dimethyl anilino borato benzenes or trityl borato benzenes, can also be used suitably as activating compounds.

Further suitable activating compounds are listed in WO 00/31090 and WO 99/06414, here incorporated by reference.

The catalyst system may further comprise, as additional component, a metal compound as defined both by way of generic formula, its mode and stoichiometrie of use and specific examples in WO 05/103096, incorporated hereto by reference. The metal compound can likewise be reacted in any order with the catalyst components (A) and (B) and optionally with the activating compound and the support.

To prepare the polyethylene of the invention, the ethylene is polymerized optionally with α-olefins having from 3 to 12 carbon atoms.

The α-olefins having from 3 to 12 carbon atoms are preferably in particular linear $C_3$-$C_{10}$-1-alkenes such as ethene, propene, 1-butene, 1-pentene, 1-hexene, 1-heptene, 1-octene, 1-decene or branched $C_3$-$C_{10}$-1-alkenes such as 4-methyl-1-pentene. Particularly preferred α-olefins are 1-butene and 1-hexene.

The process of the invention for polymerizing ethylene can be carried out using all industrially known polymerization methods. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example as in the Hostalen® process. A parallel reactor arrangement using two or more identical or different processes is also possible. Furthermore, molar mass regulators, for example hydrogen, or customary additives such as antistatics can also be used in the polymerizations.

The mixing quality of the polyethylene powder obtained directly from the reactor can be tested by assessing thin slices ("microtome sections") of a sample under an optical microscope. Inhomogenities show up in the form of specks or "white spots". The specs or "white spots" are predominantly high molecular weight, high-viscosity particles in a low-viscosity matrix (cf., for example, U. Burkhardt et al. in "Aufbereiten von Polymeren mit neuartigen Eigenschaften", VDI-Verlag, Düsseldorf 1995, p. 71). Such inclusions can reach a size of up to 300 μm, cause stress cracks and result in brittle failure of components. The better the mixing quality of a polymer, the fewer and smaller are these inclusions observed. The mixing quality of a polymer is determined quantitatively in accordance with ISO 13949. According to the measurement method, a microtome section is prepared from a sample of the polymer, the number and size of these inclusions are counted and a grade is determined for the mixing quality of the polymer according to a set assessment scheme.

The ethylene polymer of the invention can also be a constituent of a polymer blend. Thus, for example, two or three different ethylene copolymers according to the invention which can differ, for example, in density and/or molar mass distribution and/or short chain branching distribution can be mixed with one another.

The blends comprising the polyethylenes of the invention can further comprise two or three other olefin polymers or copolymers. These can be, for example, LDPEs (blends thereof are described, for example, in DE-A1-19745047), or polyethylene homopolymers (blends thereof are described, for example, in EP-B-100843) or LLDPEs (as described, for example, in EP-B-728160 or WO-A-90/03414) or LLDPE/LDPE blends (WO 95/27005 or EP-B1-662989).

The ethylene copolymers, polymer blends and reactor blends can further comprise auxiliaries and/or additives known per se, e.g. processing stabilizers, stabilizers against the effects of light and heat, customary additives such as lubricants, antioxidants, antiblocking agents and antistatics and also, if appropriate, dyes. A person skilled in the art will be familiar with the type and amount of these additives.

Furthermore, it has been found that the addition of small amounts of fluoroelastomers or thermoplastic polyesters can further improve the processing properties of the polyethylenes of the invention. Such fluoroelastomers are known per se as processing aids and are commercially available, e.g. under the trade names Viton® and Dynamar® (see also, for example, U.S. Pat. No. 3,125,547). They are preferably added in amounts of from 10 to 1000 ppm, particularly preferably from 20 to 200 ppm, based on the total mass of the polymer blend according to the invention.

The polyethylenes of the invention can also be modified subsequently by grafting, crosslinking, hydrogenation, functionalization or other functionalization reactions known to those skilled in the art.

The production of the polymer blends by mixing can be carried out by all known methods. This can be effected, for example, by feeding the pulverulent components into a pelletization apparatus, e.g. a twin-screw kneader (ZSK), Farrel kneader or Kobe kneader. Furthermore, a mixture of pellets can also be processed directly on a film production plant.

The polyethylenes and polymer blends of the invention are highly suitable for, for example, the production of films on blown film and cast film plants at high outputs. The films composed of the polymer blends have very good mechanical properties, high shock resistance and high tear strength combined with very good optical properties, in particular transparency and gloss. They are particularly suitable for the packaging sector, for example heat-sealable films, for heavy duty sacks, but also for the food sector. In addition, the films display only a low tendency to blocking and can therefore be handled on machines without lubricants and antiblocking additives or using only small amounts of these.

Owing to their good mechanical properties, the polyethylenes of the invention are likewise suitable for producing fibers and moldings, in particular for pipes and crosslinkable pipes. They are likewise suitable for blow molding, roto molding or injection molding. They are also suitable as compounding components, bonding agents and as rubber components in polypropylene, in particular in polypropylene compounds having high impact toughnesses.

Fibers, films and moldings in which the polyethylene of the invention is comprised as substantial component are ones which comprise from 50 to 100% by weight, preferably from 60 to 90% by weight, of the polyethylene of the invention, based on the total polymer material utilized for manufacture. In particular, films and moldings in which one of the layers comprises from 50 to 100% by weight of the polyethylene of the invention are also comprised.

The following examples illustrate the invention without restricting the scope of the invention.

The measured values described were determined in the following way:

The determination of the molar mass distributions and the means Mn, Mw and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB.

A WATERS Alliance 2000 equipped with the following precolumn SHODEX UT-G and separation columns SHODEX UT 806 M (3×) and SHODEX UT 807 connected in series was used. The solvent was vacuum destilled under Nitrogen and was stabilized with 0.025% by weight of 2,6-di-tert-butyl-4-methylphenol. The flowrate used was 1 ml/min, the injection was 500 μl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753 (1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTG-PC_V6.4.24 (hs GmbH, Hauptstraβe 36, D-55437 Ober-Hilbersheim) respectively.

Density of compression moulded plaques was determined according to DIN EN ISO 1183-1, Method A (Immersion).

The compression moulded plaques (thickness 2 mm) were prepared with a defined thermal history: Press conditions: temperature, pressure and time: 180° C., 200 bar for 8 min, Crystallization in boiling water for 30 min.

The branches/1000 carbon atoms are determined by means of $^{13}$C-NMR, as described by James. C. Randall, JMS-REV. Macromol. Chem. Phys., C29 (2&3), 201-317 (1989), and refer to the total content of $CH_3$ groups/1000 carbon atoms The determination of the vinyl groups/1000 carbon atoms is carried out in accordance with ASTM D 6248-98

PREPARATION OF THE INDIVIDUAL COMPONENTS

Example 1

Preparation of 2,6-bis[1-(2-chloro-4,6-dimethylphenylimino)ethyl]pyridine iron chloride

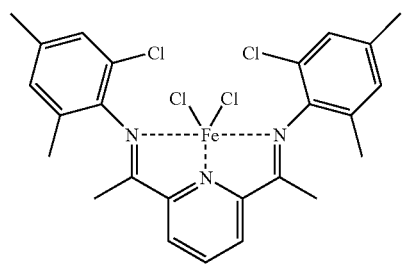

2,6-bis[1-(2-Chloro-4,6-dimethylphenylimino)ethyl]pyridine iron chloride was prepared as described by Lutz et al., C. R. Chimie 5 (2002), pp. 43-48.

Example 2

Preparation of 2,6-bis[1-(2,4-dichloro-6-methylphenylimino)ethyl]pyridine iron chloride

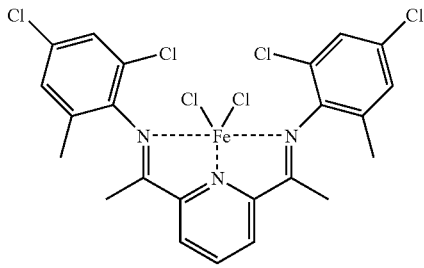

2,6-bis[1-(2,4-dichloro-6-methylphenylimino)ethyl]pyridine iron chloride was prepared according to the method of Qian et al., Organometallics 2003, 22, 4312-4321. Here, 65.6 g of 2,6-diacetylpyridine (0.4 mol), 170 g of 2,4-dichloro-6-methylaniline (0.483 mol), 32 g of silica gel type 135 and 160 g of molecular sieves (4 Å) were stirred in 1500 ml of toluene at 80° C. for 5 hours and a further 32 g of silica gel type 135 and 160 g of molecular sieves (4 Å) were subsequently added. The mixture was stirred at 80° C. for a further 8 hours, the insoluble solid was filtered off and washed twice with toluene. The solvent was distilled off from the filtrate obtained in this way, the residue was admixed with 200 ml of methanol and subsequently stirred at 55° C. for 1 hour. The suspension formed in this way was filtered and the solid obtained was washed with methanol and freed of the solvent. This gave 95 g of 2,6-diacetylpyridinebis(2,4-dichloro-6-methylphenyl) in 47% yield. The reaction with iron(II) chloride was carried out as described by Qian et al., Organometallics 2003, 22, 4312-4321.

Example 3

Preparation of 1,3-propandiylbis(4,7-dimethyl-1-indenyl)zirconium dichloride 4.5 g of 1,3-bis(4,7-dimethyl-1-indenyl) propane (MW 328.5 g/mol, 13.69 mmol) were dissolved in 63 ml of $Et_2O$ in a 250 ml flask equipped with stirring bar. 11.52 ml of n-BuLi (2.5 M in hexane, 28.8 mmol) were added dropwise to this solution at −20 C. At the end of the addition the white suspension was stirred for 5 hours at room temperature. 3.26 g of $ZrCl_4$ (MW 233.03, g/mol, 13.98 mmol) were slurried in 40 ml of toluene in a 50 ml flask equipped with magnetic stirrer. Both suspensions were cooled to −20° C., and subsequently the slurry of $ZrCl_4$ was added to the salt. The cooling bath was removed and the yellow suspension was stirred for 16 hours.

After this time, the mixture was filtered; the yellow precipitate isolated (6.78 g) was dried and analysed by $^1H$ NMR spectroscopy. 6.64 g of this product were extracted with 100 ml of toluene. The organic layer was concentrated in vacuo to obtain 2.89 g of yellow powder (chemical yield 44%), which was a mixture of 84:16 rac/meso-1,3-propandiylbis(4,7-dimethyl-1-indenyl)zirconium dichloride (by $^1H$ NMR).

Bis(n-butylcyclopentadienyl)hafnium dichloride is commercially available from Crompton.

Preparation of the Mixed Catalyst Systems

As a support silica gel XPO-2107 was used, a spray-dried silica gel from Grace, which was baked at 600° C. for 6 hours. It had a pore volume of 1.5 ml/g, and a water content of less than 1% by weight.

Preparation of the Mixed Catalyst Systems

The silica gel XPO-2107 used, a spray-dried silica gel from Grace, was baked at 600° C. for 6 hours. It had a pore volume of 1.5 ml/g, and a water content of less than 1% by weight.

Example 4

10.5 ml of MAO (4.75 M in toluene, 49.9 mmol) was added to a suspension of 16.7 g of the pretreated support material in 80 ml of toluene at 0° C. The suspension was stirred for 30 minutes. The solvent was removed and the residue resuspended in 80 ml toluene.

A mixture of 56.5 mg (0.1 mmol) of 2,6-bis[1-(2,4-dichloro 6-methylphenylimino)ethyl]pyridine iron dichloride and 489.6 mg (1 mmol) of 1,3-propanediylbis(4,7-dimethyl-indenyl) zirconium dichloride and 23.2 ml MAO (4.75 M in toluene, 110.2 mmol) was added thereto and the mixture was stirred at room temperature for 1 hour. The solid was filtered off. The yield was 25 g of catalyst

Example 5

7.2 ml of MAO (4.75 M in toluene, 34.2 mmol) was added to a suspension of 11.5 g of the pretreated support material in 80 ml of toluene at 0° C. The suspension was stirred for 30 minutes. The solvent was removed and the residue resuspended in 80 ml toluene.

A mixture of 77.9 mg (0.138 mmol) of 2,6-bis[1-(2-chloro-4,6-dimethylphenylimino)ethyl]pyridine iron dichloride and 337.1 mg (0.69 mmol) of 1,3-propanediylbis(4,7-dimethyl-indenyl) zirconium dichloride and 17.4 ml MAO (4.75 M in toluene, 82.65 mmol) were added thereto and the mixture was stirred at room temperature for 1 hour. The solid was filtered off. The yield was 19.6 g of catalyst.

Example 6

Comparative Example 9.2 ml of MAO (4.75 M in toluene, 43.7 mmol) was added to a suspension of 14.79 g of the pretreated support material in 80 ml of toluene at 0° C. The suspension was stirred for 30 minutes. The solvent was removed and the residue resuspended in 80 ml toluene.

A mixture of 63.2 mg (0.104 mmol) of 2,6-bis[1-(2,4-dichloro-6-methylphenylimino)ethyl]pyridine iron dichloride, 438 mg (0.89 mmol) of bis(n-butylcyclopentadienyl) hafnium dichloride and 18.8 ml of MAO (4.75 M in toluene, 89.5 mmol) were added thereto and the mixture was stirred at room temperature for 1 hour. The solid was filtered off. The yield was 31.04 g of catalyst.

Polymerization in an Autoclave 2 ml of a triisobutylaluminum solution in heptane (corresponding to 75 mg of triisoprenylaluminum) were added to a 1 l autoclave which had been charged with an initial charge of 100 g of polyethylene and had been made inert by means of argon, and the amount and kind of catalyst solid indicated in table 1 was finally introduced. Polymerization was carried out at an ethylene pressure of 10 bar (total pressure=19 bar) and 90° C. for 60 min. The polymerization was stopped by venting the autoclave and the product was discharged through the bottom valve. The data pertaining to the polymerizations are summarized in table 1.

Polymerization in a Fluidized-Bed Reactor

The polymerization was carried out in a fluidized-bed reactor having a diameter of 0.5 m. The reaction temperature, output, productivity and the composition of the reactor gas are reported in table 2, and the pressure in the reactor was 20 bar. 0.1 g of triisobutylaluminum per hour were metered in in each case. Catalysts employed were the catalysts from Examples 4 and 6.

TABLE 1

Polymerization results in the autoclave

| Catalyst from Ex. | Amount of cat [g/h] | Hexen [ml] | Prod. [PEg/g of Cat × h] | I.V. [dl/g] | Mw [kg/mol] | Mw/Mn | Density [g/cm³] |
|---|---|---|---|---|---|---|---|
| 4 | 98 | 3 | 612 | 2.2 | 121 | 10.5 | 0.9352 |
| 5 | 56 | 3 | 500 | 1.7 | 109 | 8.7 | 0.9347 |
| 6 | 209 | 10 | 373 | 2.05 | 140 | 15.29 | 0.9402 |

TABLE 2

Polymerization results in the fluidized bed reactor

| Catalyst from Ex. | Output [g/h] | T(poly) [° C.] | Prod. [g/g of cat] | Ethene [% by volume] | Hexene [% by volume] | H₂ [Vol %] | Mw [kg/mol] | Mw/Mn | Density [g/cm³] | Vinyl/ 1000 C. | CH₃/ 1000 C. |
|---|---|---|---|---|---|---|---|---|---|---|---|
| 4 | 5.6 | 85.2 | 7500 | 45.62 | 0.43 | — | 143.347 | 4.6 | 0.939 | 0.23 | 3.7 |
| 6 | 3.5 | 94 | 1807 | 41.97 | 0.17 | — | 115.570 | 9.7 | 0.953 | 1.25 | 3.8 |

The invention claimed is:

1. A hybrid catalyst system for polymerization of olefins comprising a late transition metal component of formula (I),

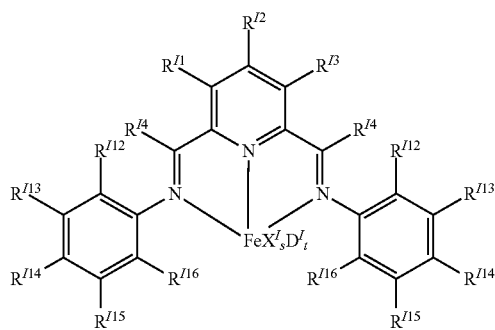

wherein the variables have the following meaning:

$R^{I4}$ independently of one another denote hydrogen, $C_1$-$C_{20}$-alkyl, $C_2$-$C_{20}$-alkenyl, $C_6$-$C_{20}$-aryl, arylalkyl having 1 to 10 carbon atoms in the alkyl radical and 6 to 20 carbon atoms in the aryl radical, or $SiR^{I8}_3$, wherein the organic radicals $R^{I4}$ can also be substituted by halogens, $R^{I13}$-$R^{I15}$ independently of one another denote hydrogen, $C_1$-$C_{22}$-alkyl, $C_2$-$C_{22}$-alkenyl, $C_6$-$C_{22}$-aryl, arylalkyl having 1 to 10 carbon atoms in the alkyl radical and 6 to 20 carbon atoms in the aryl radical, $NR^{I9}_2$, $OR^{I9}$, halogen, $SiR^{I8}_3$ or five-, six- or seven-membered heterocyclyl, which comprises at least one atom from the group consisting of N, P, O or S, wherein the organic radicals $R^{I13}$-$R^{I14}$ are unsubstituted or substituted by halogens, $NR^{I9}_2$, $OR^{I9}$ or $SiR^{I8}_3$ or two radicals $R^{I13}$-$R^{I15}$ are bonded with one another to form a five-, six- or seven-membered ring or two radicals $R^{I13}$-$R^{I15}$ are bonded with one another to form a five-, six- or seven-membered heterocyclyl, which comprises at least one atom from the group consisting of N, P, O or S, wherein at least one of the radicals $R^{I12}$-$R^{I16}$ is selected from the group consisting of chlorine, bromine, iodine, $CF_3$ or $OR^{I9}$, $R^{I12}$ are each, independently of one another, halogen, and $R^{I16}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, where the organic radicals $R^{I16}$ may also be substituted by halogen $R^{I1}$-$R^{I3}$ independently of one another denote hydrogen, $C_1$-$C_{22}$-alkyl, $C_2$-$C_{22}$-alkenyl, $C_6$-$C_{22}$-aryl, $NR^{I9}_2$, $OR^{I9}$, halogen, $SiR^{I8}_3$ or five-, six- or seven-membered heterocycles, which comprise at least one atom from the group consisting of N, P, O or S, wherein the organic radicals $R^{I1}$-$R^{I3}$ are optionally substituted by halogen radicals, $C_1$-$C_{10}$-alkyl radicals, $C_2$-$C_{10}$-alkenyl radicals, $C_6$-$C_{20}$-aryl radicals, $NR^{I9}_2$, $OR^{I9}$ or $SiR^{I8}_3$ and/or two radicals $R^{I1}$-$R^{I3}$ are bonded with one another to form a five-, six- or seven-membered ring and/or two radicals $R^{I1}$-$R^{I3}$ are bonded with one another to form a five-, six- or seven-membered heterocycle, which comprises at least one atom from the group consisting of N, P, O or S, $R^{I8}$ independently of one another denote hydrogen, $C_1$-$C_{22}$-alkyl, $C_2$-$C_{22}$-alkenyl, $C_6$-$C_{22}$-aryl, arylalkyl having 1 to 10 carbon atoms in the alkyl radical and 6 to 20 carbon atoms in the aryl radical, $R^{I9}$ independently of one another denote hydrogen, $C_1$-$C_{22}$-alkyl, $C_2$-$C_{22}$-alkenyl, $C_6$-$C_{22}$-aryl, or $SiR^{I8}_3$, wherein the organic radicals $R^{I9}$ is optionally substituted by halogen radicals, $C_1$-$C_{10}$-alkyl radicals, $C_2$-$C_{10}$-alkenyl radicals, or $C_6$-$C_{20}$-aryl radicals, and/or two radicals $R^{I9}$ are bonded with one another to form a five- or six-membered ring, $X^I$ independently of one another denote fluorine, chlorine, bromine, iodine, hydrogen, $C_1$-$C_{10}$-alkyl, $C_2$-$C_{10}$-alkenyl, $C_6$-$C_{20}$-aryl, $NR^{I10}_2$, $OR^{I10}$, $SR^{I10}$, $SO_3R^{I10}$, $OC(O)R^{I10}$, CN, SCN, β-diketonate, CO, $BF_4^-$, $PF_6^-$ or bulky non-coordinating anions, wherein the organic radicals $X^I$ is optionally substituted by halogen radicals, $C_1$-$C_{10}$-alkyl radicals, $C_2$-$C_{10}$-alkenyl radicals, or $C_6$-$C_{20}$-aryl radicals, and the radicals $X^I$ are optionally bonded with one another, s is 1, 2, 3 or 4, $D^I$ is a neutral donor, t is 0 to 4 and a metallocene component of formula (II)

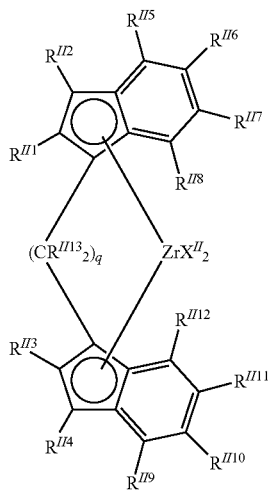

(II)

wherein
$R^{II1}$ to $R^{II12}$ are the same or different from each other, hydrogen or a $C_1$-$C_{40}$ radical, and optionally two adjacent $R^{II1}$ to $R^{II12}$ substituents form a ring comprising from 5 to 8 carbon atoms;
$R^{II13}$ are the same or different and are each hydrogen atoms, $C_1$-$C_{20}$-alkyl-, $C_3$-$C_{20}$-cycloalkyl-, $C_2$-$C_{20}$-alkenyl-, $C_6$-$C_{20}$-aryl-, $C_7$-$C_{20}$-alkylaryl-, $C_7$-$C_{20}$-arylalkyl-, $NR^3_2$—, $PR^3_2$—, $AsR^3_2$—, $OR^3$—, $SR^3$— or $SeR^3$ radicals, optionally containing silicon, germanium or halogen atoms;
$X^{II}$ are identical or different and are each a hydrogen atom, a halogen atom, or a $C_{1\text{-}22}$ radical, —$OR^{II14}$ or $NR^{II14}R^{II15}$, the radicals $R^{II14}$ and $R^{II15}$ being each $C_1$-$C_{32}$ radical, $C_1$-$C_{32}$ fluoroalkyl or fluoroaryl radical, or two radicals $X^{II}$ are joined to one another; and
q is an integer from 3 to 8.

2. The catalyst system according to claim 1 wherein $R^{I13}$ and $R^{I16}$ are each, independently of one another, hydrogen, $C_1$-$C_{22}$-alkyl or halogen.

3. The catalyst system according to claim 1 wherein $X^{II}$ are same and each chlorine or a methyl radical.

4. The catalyst system according to claim 1 wherein the substituents $R^{II1}$ to $R^{I14}$, $R^{I16}$, $R^{I17}$, $R^{II10}$, $R^{II11}$ are each hydrogen radicals, q is 3, n is 2 and the substituents $R^{II5}$, $R^{II8}$, $R^{II9}$, $R^{II12}$ each are methyl.

5. The catalyst system according to claim 1 further comprising a support.

6. A process for preparing polyethylene, wherein ethylene is polymerized in the presence of a catalyst system according to claim 1.

7. The process according to claim 6, wherein a monomer mixture of ethylene and/or $C_3$-$C_{12}$-1-alkenes which comprises at least 50 mol % of ethylene is used as monomers in the polymerization.

* * * * *